US012152290B2

(12) United States Patent
Schmidt et al.

(10) Patent No.: US 12,152,290 B2
(45) Date of Patent: *Nov. 26, 2024

(54) NICKEL BASE ALLOY FOR POWDER AND METHOD FOR PRODUCING A POWDER

(71) Applicant: VDM Metals International GmbH, Werdohl (DE)

(72) Inventors: Christina Schmidt, Bochum (DE); Andreas Heckmann, Dortmund (DE)

(73) Assignee: VDM Metals International GmbH, Werdohl (DE)

( * ) Notice: Subject to any disclaimer, the term of this patent is extended or adjusted under 35 U.S.C. 154(b) by 456 days.

This patent is subject to a terminal disclaimer.

(21) Appl. No.: 17/603,835

(22) PCT Filed: Jul. 1, 2020

(86) PCT No.: PCT/DE2020/100574
§ 371 (c)(1),
(2) Date: Oct. 14, 2021

(87) PCT Pub. No.: WO2021/004579
PCT Pub. Date: Jan. 14, 2021

(65) Prior Publication Data
US 2022/0205066 A1 Jun. 30, 2022

(30) Foreign Application Priority Data

Jul. 5, 2019 (DE) .................... 10 2019 118 219.0
Jun. 26, 2020 (DE) .................... 10 2020 116 858.6

(51) Int. Cl.
*B22F 9/08* (2006.01)
*C22B 9/20* (2006.01)
*C22C 19/05* (2006.01)
*B22F 1/00* (2022.01)
*B22F 1/065* (2022.01)
*B22F 10/34* (2021.01)
*B33Y 70/00* (2020.01)

(52) U.S. Cl.
CPC .............. *C22C 19/05* (2013.01); *B22F 9/082* (2013.01); *C22B 9/20* (2013.01); *C22C 19/055* (2013.01); *C22C 19/056* (2013.01); *B22F 1/00* (2013.01); *B22F 1/065* (2022.01); *B22F 2009/0824* (2013.01); *B22F 2009/0844* (2013.01); *B22F 2009/0848* (2013.01); *B22F 10/34* (2021.01); *B22F 2201/02* (2013.01); *B22F 2201/11* (2013.01); *B22F 2301/15* (2013.01); *B22F 2303/01* (2013.01); *B22F 2304/10* (2013.01); *B22F 2998/10* (2013.01); *B22F 2999/00* (2013.01); *B33Y 70/00* (2014.12)

(58) Field of Classification Search
None
See application file for complete search history.

(56) References Cited

U.S. PATENT DOCUMENTS

| 3,591,362 | A | 7/1971 | Benjamin |
| 3,802,938 | A | 4/1974 | Collins et al. |
| 4,047,933 | A | 9/1977 | Larson et al. |
| 6,416,564 | B1 | 7/2002 | Bond et al. |
| 6,562,157 | B2 | 5/2003 | Nonomura et al. |
| 7,484,926 | B2 | 2/2009 | Suga et al. |
| 7,946,813 | B2 | 5/2011 | Fukuda et al. |
| 8,147,749 | B2 | 4/2012 | Reynolds |
| 9,238,854 | B2 | 1/2016 | Kwon et al. |
| 9,932,656 | B2 | 4/2018 | Hattendorf et al. |
| 11,193,186 | B2 | 12/2021 | Kiese et al. |
| 11,306,380 | B2 | 4/2022 | Gehrmann et al. |
| 11,767,579 | B2 * | 9/2023 | Wolf .................. B22F 9/082 420/443 |
| 11,807,916 | B2 * | 11/2023 | Gehrmann ............ C22C 19/057 |
| 2008/0166258 | A1 | 7/2008 | Tanimoto et al. |
| 2009/0123690 | A1 | 5/2009 | Scholl et al. |
| 2009/0277301 | A1 | 11/2009 | Scholl et al. |
| 2010/0303666 | A1 | 12/2010 | Bain et al. |
| 2011/0195269 | A1 * | 8/2011 | Minisandram ........... B22D 7/00 428/615 |
| 2013/0011295 | A1 | 1/2013 | Kloewer et al. |

(Continued)

FOREIGN PATENT DOCUMENTS

| CA | 937426 A | 11/1973 |
| CA | 945784 A | 4/1974 |

(Continued)

OTHER PUBLICATIONS

English translation of the International Preliminary Report on Patentability and Written Opinion of the International Searching Authority in PCT/DE2020/100576, mailed Jan. 20, 2022.
International Search Report in PCT/DE2020/100576, mailed Oct. 19, 2020.
International Search Report in PCT/DE2020/100574, mailed Oct. 1, 2020.
Quanyan Wu et al.: Microstructure of Long-Term Aged IN617 Ni-Base Superalloy, Metallurgical and Materials Transactions A, Springer-Verlag, New York, Bd. 39, Nr. 11, pp. 25469-2585.
Japanese Office Action dated Sep. 2, 2022 in Japanese Application No. 2021-568159 with English translation.

(Continued)

*Primary Examiner* — George Wyszomierski
(74) *Attorney, Agent, or Firm* — Collard & Roe, P.C.

(57) ABSTRACT

A powder has the contents (in wt. %): C max. 0.5%, S max. 0.15%, in particular max. 0.03%, N max. 0.25%, Cr 14-35%, in particular 17-28%, Ni radical (>38%), Mn max. 4%, Si max. 1.5%, Mo>0-22%, Ti<4%, in particular <3.25%, Nb up to 6.0%, Cu up to 3%, in particular up to 0.5%, Fe<50%, P max. 0.05%, in particular max. 0.04%, Al up to 3.15%, in particular up to 2.5%, Mg max. 0.015%, V max. 0.6%, Zr max. 0.12%, in particular max. 0.1%, W up to 4.5%, in particular up to max. 3%, Co up to 28%, B<0.125%, O>0.00001-0.1% and impurities due to production, wherein Ni+Fe+Co represents 56-80% Nb+Ta<6.0%.

13 Claims, No Drawings

(56) References Cited

U.S. PATENT DOCUMENTS

| | | |
|---|---|---|
| 2013/0228302 A1 | 9/2013 | Rickenbacher et al. |
| 2014/0238552 A1* | 8/2014 | Forbes Jones ........ C22C 38/005 148/501 |
| 2015/0344994 A1 | 12/2015 | Etter et al. |
| 2015/0354031 A1 | 12/2015 | Gehrmann et al. |
| 2016/0265694 A1 | 9/2016 | Tomio et al. |
| 2018/0298470 A1 | 10/2018 | Suzuki et al. |
| 2019/0040501 A1 | 2/2019 | Gehrmann et al. |
| 2019/0048451 A1 | 2/2019 | Ota et al. |
| 2019/0055627 A1 | 2/2019 | Nagatomi et al. |
| 2019/0284666 A1 | 9/2019 | Okada et al. |
| 2020/0206816 A1 | 7/2020 | Daigo et al. |

FOREIGN PATENT DOCUMENTS

| | | |
|---|---|---|
| CA | 1253363 A | 5/1989 |
| CA | 2704874 A1 | 11/2010 |
| CA | 2901259 A1 | 8/2014 |
| CA | 2874304 C | 8/2017 |
| CN | 1840719 A | 10/2006 |
| CN | 1854464 A | 11/2006 |
| CN | 101158289 A | 4/2008 |
| CN | 104561662 A | 4/2015 |
| CN | 105008562 A | 10/2015 |
| CN | 105143482 A | 12/2015 |
| CN | 106735273 A | 5/2017 |
| CN | 107904448 A | 4/2018 |
| CN | 108115136 A | 6/2018 |
| CN | 108165830 A | 6/2018 |
| CN | 108543950 A | 9/2018 |
| CN | 108941588 A | 12/2018 |
| DE | 1909781 A1 | 2/1970 |
| DE | 2108973 A1 | 9/1971 |
| DE | 2108978 A1 | 9/1971 |
| DE | 69908134 T2 | 1/2004 |
| DE | 60100884 T2 | 7/2004 |
| DE | 10 2010 011 609 A1 | 9/2011 |
| DE | 10 2013 018 006 A1 | 6/2014 |
| DE | 10 2015 008 322 A1 | 1/2017 |
| DE | 10 2015 016 729 A | 6/2017 |
| EP | 1 377 690 B1 | 1/2008 |
| EP | 2314725 A1 | 4/2011 |
| EP | 2949768 A1 | 12/2015 |
| EP | 3 120 953 A1 | 1/2017 |
| GB | 813948 A | 5/1959 |
| GB | 1 324 621 A | 7/1973 |
| GB | 2 311 997 A | 10/1997 |
| JP | 2004-527377 A | 9/2004 |
| JP | 2013-522465 A | 6/2013 |
| JP | 2015-224394 A | 12/2015 |
| JP | 2019-035144 A | 3/2019 |
| JP | 2019049015 A | 3/2019 |
| KR | 1020180040513 A | 4/2018 |
| WO | 02/072897 A1 | 9/2002 |
| WO | 2006/072586 A2 | 7/2006 |
| WO | 2008/006801 A1 | 1/2008 |
| WO | 2012047352 A2 | 4/2012 |
| WO | 2014124626 A1 | 8/2014 |
| WO | 2015/110668 A2 | 7/2015 |
| WO | 2017/026519 A1 | 2/2017 |
| WO | 2018/066579 A1 | 4/2018 |
| WO | 2019020145 A1 | 1/2019 |
| WO | 2019/049594 A1 | 3/2019 |
| WO | 2019110050 A1 | 6/2019 |

OTHER PUBLICATIONS

English translation of the International Preliminary Report on Patentability and Written Opinion of the International Searching Authority in PCT/DE2020/100574, mailed Jan. 20, 2022.

R. A. Ricks, A. J. Porter, R. C. Ecob, The Growth of γ' Precipitates in Nickel-Base Superalloys; Acta Metall., 31, 43-53 (1983).

L. A. Al-Juboori, T. Niendorf, F. Brenne; On the Tensile Properties of Inconel 718 Fabricated by EBM for As-Built and Heat-Treated Components; Metallurgical and Materials Transactions B, vol. 49B, 2018.

M. M. Attallah et al. "Additive manufacturing of Ni-based superalloys: The outstanding issues", MRS Bull., vol. 41, No. 10, pp. 758-764, 2016.

Use of multi-focus technology in laser and electron beam welding to influencmelt pool dynamics using the example of precipitation-curing nickel-based superalloys (FokuWob), DVS Forschungsvereinigung, vol. 229, downloaded Feb. 4, 2022, 2 pages (Abstract).

G. Cam and M. Kocak, "Progress in joining of advanced materials", International Materials Reviews, 1998, vol. 43, No. 1, 45 pages.

N.C. Sekhar and R. C. Reed, "Power beam welding of thick section nickel base superalloys", Science and Technology of Welding and Joining, 2002, vol. 7, No. 2, pp. 77-87.

\* cited by examiner

NICKEL BASE ALLOY FOR POWDER AND METHOD FOR PRODUCING A POWDER

CROSS REFERENCE TO RELATED APPLICATIONS

This application is the National Stage of PCT/DE2020/100574 filed on Jul. 1, 2020, which claims priority under 35 U.S.C. § 119 of German Application Nos. 10 2019 118 219.0 filed on Jul. 5, 2019 and 10 2020 116 858.6 filed on Jun. 26, 2020, the disclosures of which are incorporated by reference. The international application under PCT article 21(2) was not published in English.

The invention relates to a nickel base alloy for powder.

WO 2015/110668 A2 discloses a method for the manufacture of iron-base powders, which are atomized by means of a centrifuge, with the following method steps:
providing an alloy having a melting point above 1040° C., melting the composition,
atomizing the molten composition by means of a centrifuge or a rotating atomization device.

DE 10 2015 016 729 A discloses a method for the manufacture of metallic semi-finished products from an alloy having more than 50% nickel, containing the following process steps:
an electrode is generated by VIM,
for reduction of stresses and for overaging, the electrode is subjected in a furnace to a heat treatment in the temperature range between 400 and 1250° C. for a period of 10 to 336 hours,
in a manner depending on dimensions, especially depending on diameter, the electrode is cooled in air or in the furnace to a temperature between room temperature and lower than 1250° C., especially lower than 900° C.,
the cooled electrode is then remelted by VAR at a remelting rate of 3.0 to 10 kg/minute to obtain a VAR ingot,
the VAR ingot is heat-treated in a furnace in the temperature range between 400 and 1250° C. for a period of 10 to 336 hours.
in a manner depending on dimensions, especially depending on diameter, the VAR ingot is cooled in air or in the furnace to a temperature between room temperature and lower than 1250° C., especially lower than 900° C.,
the VAR ingot is remelted once again at a remelting rate of 3.0 to 10 kg/minute,
the remelted VAR ingot is subjected to a heat treatment in the temperature range between 400 and 1250° C. for a period of 10 to 336 hours,
the VAR ingot is then brought by hot and/or cold working to the desired product shape and dimension.

It is generally known that Ni and Ni—Co alloys are used in order to fabricate structural parts having special properties in terms of corrosion resistance and good mechanical properties, such as strength, high-temperature strength and fracture toughness.

The task underlying the invention is to provide, for the additive fabrication of components, a powder that has the advantageous properties of the Ni and Ni—Co alloys and can be manufactured inexpensively. Moreover, the powder described above may be used for the manufacture of the structural parts by means of hot isostatic pressing (HIP) or conventional sintering and extrusion-pressing processes. Moreover, the method combination of additive fabrication and subsequent HIP treatment is possible. For this purpose it is possible to apply the post processing steps described below for HIP structural parts for the generative fabrication. In this regard, it is important to meet the special requirements applicable to distribution of the particle size, particle shape and pourability of the powder.

Furthermore, it is intended to propose a method for the manufacture of such a powder.

This task is accomplished by a nickel-base alloy for powder, wherein the contents (in wt %) are defined as follows:

| | |
|---|---|
| C | max. 0.5% |
| S | max. 0.15%, especially max. 0.03% |
| N | max. 0.25% |
| Cr | 14-35%, especially 17-28% |
| Ni | the rest (>38%) |
| Mn | max. 4% |
| Si | max. 1.5% |
| Mo | >0-22% |
| Ti | ≤4%, especially ≤3.25% |
| Nb | up to 6.0% |
| Cu | up to 3%, especially up to 0.5% |
| Fe | ≤50% |
| P | max. 0.05%, especially max. 0.04% |
| Al | up to 3.15%, especially up to 2.5% |
| Mg | max. 0.015% |
| V | max. 0.6% |
| Zr | max. 0.12%, especially max. 0.1% |
| W | up to 4.5%, especially up to max. 3% |
| Co | up to 28% |
| B | ≤0.125% |
| O | >0.00001-0.1% | and manufacturing-related impurities.
wherein:
Ni+Fe+Co 56-80%
Nb+Ta 6.0%.

Advantageous further developments of the powder alloy according to the invention can be inferred from the associated dependent claims.

Advantageously, the powder alloy according to the invention is intended to have the following composition (in wt %):

| | |
|---|---|
| C | max. 0.25% |
| S | max. 0.03% |
| N | >0-0.15% |
| Cr | 17-28%, especially 17-24% |
| Ni | the rest (38-72%) |
| Mn | max. 2%, especially max. 1% |
| Si | max. 1.2%, especially ≤0.5% |
| Mo | >0-21, especially 2.5-21% |
| Ti | >0-<3.25% |
| Nb | >0-5.5% |
| Cu | max. 3%, especially up to 0.5% |
| Fe | >0-38% |
| P | max. 0.04% |
| Al | >0-0.8% |
| Mg | max. 0.015% |
| V | max. 0.4% |
| Zr | max. 0.1% |
| W | up to 0.5% |
| Co | ≤10% |
| B | ≤0.01% |
| Pb | max. 0.001%, especially max. 0.0005% |
| Se | max. 0.0005%, especially max. 0.0003% |
| Bi | max. 0.00005%, especially max. 0.00003% |
| O | >0.00001-0.1% |
| Nb + Ta | >0-5.5% | and manufacturing-related impurities.
wherein:
Ni+Fe+Co 59-72%.

Furthermore, the possibility exists of composing the powder alloy for specific application situations as follows:

| | |
|---|---|
| C | >0-0.1%, especially >0-0.08% |
| S | max. 0.015% |
| N | >0-0.03% |
| Cr | 17-24% |
| Ni | the rest (>50-63%) |
| Mn | max. 1.0%, especially max. 0.5% |
| Si | max. 0.5% |
| Mo | 2.8-16.5% |
| Ti | >0-1.15% |
| Nb | >0-≤5.5% |
| Cu | max. 0.5% |
| Fe | >0-25% |
| P | max. 0.015% |
| Al | 0.1-0.6% |
| Mg | max. 0.015% |
| V | max. 0.2% |
| Zr | max. 0.1% |
| W | up to 0.2% especially >0-0.2% |
| Co | ≤2.5%, especially ≤1.0% |
| B | ≤0.01% |
| Pb | max. 0.001%, especially max. 0.0005% |
| Se | max. 0.0005%, especially max. 0.003% |
| Bi | max. 0.0005%, especially max. 0.0003% |
| O | >0.00001-0.1% |
| Nb + Ta | >0-5.5% |
| Al + Ti | <1.2% | and manufacturing-related impurities.
wherein:
Ni+Fe+Co 59-72%.

This task is also accomplished by a method for the manufacture of a powder from a nickel-base alloy according to the invention in which
an alloy is melted in a VIM furnace,
the molten melt is maintained for 5 minutes to 2 hours for homogenization,
a closed atomization system having a supplied gas is adjusted to a dew point of −10° C. to −120° C.,
the melt is blown by a nozzle in a gas stream with a gas flow rate of 2 qm³/min to 150 qm³/min,
the solidified powder particles are collected in a gas-tight closed container, wherein
the particles have a particle size of 5 µm to 250 µm,
the particles of the powder are spherical,
the powder has gas inclusions of 0.0 to 4% pore area (pores>1 µm) in relationship to the total area of evaluated objects,
the powder has a bulk density of 2 up to the density of the alloy, which is approximately 8 g/cm³,
the powder is packed air-tightly under the protective-gas atmosphere with argon.

Advantageous further developments of the method according to the invention can be inferred from the associated dependent claims according to the method.

The following initial fabrication steps are conceivable:
a master alloy ingot having defined chemical analysis is generated by melting in the VIM furnace, VIM/ESR, VIM/ESR/VAR, VIM/VAR, VOD or VLF then remelting in the ESR and/or VAR if necessary, depending on the purity requirements of the material.
cutting a master alloy ingot into small pieces by sawing, melting the pieces of the master alloy in a VIM furnace, or
melting alloying elements of a defined weight corresponding to the chemical analysis in a VIM furnace, or
the combination between master alloy material, process-related scrap (including scrap from customers, such as recycled powder as well as support structures or defective structural parts) as well as new alloying elements in the ratio from 0 to 100%. The exact ratio is estimated in each case with consideration of qualitative, economic and ecological aspects. It may be of advantage if the master alloy ingot is subjected, prior to the dissection, to a machining of the surface (e.g. by brushing, grinding, pickling, cutting, scalping, etc.). In the process, defects may be removed that are not eliminated by the further remelting and that may cause impairment for subsequent applications. Moreover, the use of possible master alloys leads to the maintenance of highest quality demands on the chemical purity of the powder that can be ensured only by previous remelting processes,
maintaining the molten melt for 5 minutes to 2 hours for homogenization.

After the alternative initial fabrication steps, the following further processing steps may take place:
the closed atomization system is adjusted with argon gas to a dew point of −10° C. to −120° C., preferably in the range of −30° C. to −100° C.,
the melt is blown by a nozzle in an argon stream with a gas flow rate of 2 qm³/min to 150 m³/min,
the solidified powder particles are collected in a gas-tight closed container,
the particles have a particle size of 5 µm to 250 µm, wherein preferred ranges lie between 5 and 150 µm, or 10 and 150 µm,
the particles of the powder are spherical,
the powder has gas inclusions of 0.0 to 4% pore area (pores>1 µm) in relationship to the total area of evaluated objects, wherein preferred ranges are from 0.0 to 2%. The quantity of the gas inclusions of the powder permits a low residual porosity of the manufactured parts.
the powder has a bulk density of 2 up to the density of the alloy, which is approximately 8 g/cm³, wherein preferred ranges have values from 4 to 5 g/cm³,
the powder is packed air-tightly under a protective-gas atmosphere with argon.

The powder according to the invention is preferably produced in a vacuum inert gas atomization system (VIGA). In this system, the alloy is melted in a vacuum induction melting furnace (VIM), directed into a casting gate that leads to a gas nozzle, in which the molten metal is atomized to metal particles with inert gas under high pressure of 5 to 100 bar. The melt is heated in the melting crucible to 5 to 400° C. above the melting point. The metal flow rate during atomization amounts to 0.5 to 80 kg/min and the gas flow rate is 2 to 150 m³/min. Due to the rapid cooling, the metal particles solidify in the form of balls (spherical particles). The inert gas used for the atomization may contain 0.01 to 100% nitrogen if necessary. The gas phase is then separated from the powder in a cyclone, and then the powder is packaged.

Alternatively, the powder according to the invention may be manufactured via the so-called EIGA method instead of via VIGA. For this purpose, a prefabricated alloy ingot in the form of a rotating electrode is melted contactlessly in an induction coil. The melt drips from the electrode directly into the gas stream of a gas nozzle.

The alloy ingot for EIGA may in turn be manufactured by the VIM, ESR, VAR, VOD or VLF melting method and combinations thereof and optionally subjected to hot-forming processes such as forging and rolling. A cleaning of the surface of the ingot by a treatment such as grinding or/and scalping prior to the use in the EIGA method is of advantage.

The inert gas for the powder manufacture may optionally be argon or a mixture of argon with 0.01 to 100% nitrogen. Possible limits of the nitrogen content may be:

0.01 to 80%
0.01 to 50%
0.01 to 30%
0.01 to 20%
0.01 to 10%
0.01 to 10%
0.1 to 5%
0.5 to 10%
1 to 5%
2 to 3%

Alternatively, the inert gas may optionally be helium.

The inert gas may preferably have a purity of at least 99.996 vol %. In particular, the nitrogen content should be from 0.0 to 10 ppmv, the oxygen content from 0.0 to 4 ppmv and have an H2O content of 5 ppmv.

In particular, the inert gas may preferably have a purity of at least 99.999 vol %. In particular, the nitrogen content should be from 0.0 to 5 ppmv, the oxygen content from 0.0 to 2 ppmv and have an H2O content of 3 ppmv.

The dew point in the system lies in the range of −10 to −120° C. It preferably lies in the range of −30 to −100° C.

The pressure during powder atomization may preferably be 10 to 80 bar.

The structural parts and components or layers on structural parts and components manufactured by means of additive fabrication are built up from layer thicknesses of 5 to 500 μm and directly after manufacture have a textured microstructure with grains elongated in structure direction and having a mean grain size of 2 μm to 1000 μm. The preferred range lies between 5 μm and 500 μm.

The structural parts and components or layers on structural parts and components manufactured by means of additive fabrication may optionally be subjected to a solution annealing in the temperature range of 700° C. to 1250° C. for 0.1 minutes to 70 hours, if necessary under shield gas, such as argon or hydrogen, for example, followed by a cooling in air, in the agitated annealing atmosphere or in the water bath. Thereafter the surface may optionally be cleaned or machined by pickling, blasting, grinding, turning, peeling, milling. Optionally, such a machining may already take place partly or completely even before the annealing.

The structural parts and components or layers on structural parts and components manufactured by means of additive fabrication may optionally be subjected to a homogenization, stress-relief, solution and/or precipitation-hardening annealing. The heat treatments may take place if necessary under shield gas, such as argon or hydrogen, for example, followed by a cooling in the furnace, if necessary under shield gas, in air, in the agitated annealing atmosphere or in the water bath.

The structural parts and components or layers on structural parts and components manufactured by means of additive fabrication have after an annealing a mean grain size of 2 μm to 2000 μm. The preferred range lies between 20 μm and 500 μm.

The structural parts and components or layers on structural parts and components manufactured from the powder generated according to the invention by means of additive fabrication are intended to be used preferably in areas in which the material is also used as wrought or cast alloy with related analysis.

Under additive fabrication, terms such as generative fabrication, rapid technology, rapid tooling, rapid prototyping or the like are also understood.

In general, the following are distinguished here:
3D printing with powders,
Selective laser sintering and
Selective laser melting
Laser deposit welding
Selective electron beam welding.

The abbreviations used here are defined as follows:
VIM Vacuum Induction Melting
VIGA Vacuum Inert Gas Atomization system
VAR Vacuum Arc Remelting
VOD Vacuum Oxygen Decarburization
VLF Vacuum Ladle Furnace
EIGA Electrode Induction Melting Gas Atomization Advantageous further developments of the method according to the invention can be inferred from the dependent claims.

The range of values for the particle size of the powder lies between 5 and 250 μm, wherein preferred ranges lie between 5 and 150 μm or 10 and 150 μm.

The powder has gas inclusions of 0.0 to 4% pore area (pores>1 μm) in relation to the total area of evaluated objects, wherein preferred ranges are 0.0 to 2%
0.0 to 0.5%
0.0 to 0.2%
0.0 to 0.1%
0.0 to 0.05%

The powder has a bulk density of 2 up to the density of the alloy, which is approximately 8 g/cm³, wherein preferred ranges may have the following values.

4-5 g/cm³
2-8 g/cm³
2-7 g/cm³
3-6 g/cm³

The quantity of the gas inclusions of the powder permits a low residual porosity of the manufactured parts.

Compared with the prior art, the centrifugation method is omitted, and hereby the operating time of the system is optimized. The subsequent refining processes optimize the quality of the powder for the additive fabrication.

It may be of advantage if the ingot is subjected, prior to the dissection, to a machining of the surface (e.g. by brushing, grinding, pickling, cutting, scalping, etc.). In the process, defects may be removed that cannot be eliminated by the further remelting and that may cause impairment for subsequent applications.

The method according to the invention can be applied to any Ni-base or Ni—Co-base alloy.

In the following, an alloy composition is presented that may be produced as powder by means of the method parameters according to the invention. All values are in wt %:

| | |
|---|---|
| C | max. 0.5% |
| S | max. 0.150%, especially max. 0.03% |
| Cr | 17-32%, especially 17-26% |
| Ni | 45-72%, especially 45-71% |
| Mn | max. 1% |
| Si | max. 1% |
| Mo | >0-10% |
| Ti | max. 3.25%, especially max. 2.7% |
| Nb | max. 5.5% |
| Cu | max. 5%, especially max. 0.5% |
| Fe | max. 25% |
| Al | max. 3.15%, especially max. 2.5% |
| V | max. 0.6% |

-continued

| | |
|---|---|
| Zr | max. 0.12%, especially max. 0.1% |
| Co | max. 28% |
| O | 0.00001-0.1% | and manufacturing-related impurities.

Beyond this, the following elements may be present (values in wt %):

Nb+Ta max. 6%

| | |
|---|---|
| B | max. 0.02%, especially max. 0.006% |
| Se | max. 0.0005% |
| Bi | max. 0.00005% |
| Pb | max. 0.002% |
| P | max. 0.03%, especially max. 0.02% |

Advantageously, the following elements may be adjusted as shown below (values in wt %):

| | |
|---|---|
| C | 0.015-0.5%; especially 0.015-0.2% |
| S | max. 0.1%, especially max. 0.02% |
| Cr | 17-25% |
| Ni | 45-58% |
| Mn | max. 0.6% |
| Si | max. 0.4% |
| Mo | 0-6.1% |
| Ti | 0.1-2.7% |
| Al | max. 1.7% |
| Co | max. 13% |

For improvement of the mechanical properties, the elements boron and carbon may also be adjusted as follows:

| | |
|---|---|
| C | 0.015-0.5% |
| B | 0.006-0.125% |

In this connection, it is further advantageous when the sum of C+B lies between 0.1875 and 0.530%, between 0.156 and 0.625%, in particular lies in the range of 0.16 and 0.6%, especially in the range of 0.1875 and 0.530%, and the ratio of C/B lies between 12 and 18.

In the following, an example of a powder from an Ni alloy on the basis of alloy 718 is presented (values in wt %):

| | |
|---|---|
| C | max. 0.08% |
| S | max. 0.015% |
| Cr | 17-21% |
| Ni | 50-55% |
| Mn | max. 0.35% |
| Si | max. 0.35% |
| Mo | 2.8-3.3% |
| Ti | 0.65-1.15% |
| Nb | 4.75-5.5 |
| Cu | max. 0.3% |
| Fe | 6-25% |
| P | max. 0.015% |
| Al | 0.2-0.8% |
| Co | max. 1% |
| B | max. 0.006% |
| Ta | max. 0.05% |
| O | 0.00001-0.1% |
| Pb | max. 0.001%, especially max. 0.0005% |
| Se | max. 0.0005%, especially max. 0.0003% |
| Bi | max. 0.00005%, especially max. 0.00003% |

Alternatively, this alloy may also have higher Ni contents (values in wt %).

| | |
|---|---|
| C | max. 0.1% |
| S | max. 0.03%, especially max. 0.02% |
| Cr | 17-32%, especially 17-30% |
| Ni | 58-79, especially 58-72% |
| Nb | max. 4.1%, especially max. 0.6% |
| Fe | max. 18% |
| C | max. 0.1% |
| S | max. 0.02% |
| Mn | max. 1% |
| Si | max. 1% |
| Mo | >0-10% |
| Ti | max. 3.25%, especially max. 2.7% |
| Cu | max. 0.5% |
| Al | max. 3.15% |
| V | max. 0.6% |
| Zr | max. 0.1% |
| Co | max. 15%, especially max. 7% |
| O | 0.00001-0.1% |
| as well as, optionally (values in wt %): | |
| B | max. 0.008%, especially max. 0.006% |
| Se | max. 0.0005% |
| Bi | max. 0.00005% |
| Pb | max. 0.002% |
| P | max. 0.03%, especially max. 0.02% |

Further restrictions are conceivable such as below (values in wt %):

| | |
|---|---|
| C | 0.01-0.04% |
| Mn | max. 0.5% |
| Si | max. 0.5% |
| Cu | max. 0.2% |

As well as, optionally if necessary (values in wt %):

| | |
|---|---|
| Mo | 8-10% |

Optionally, the oxygen content of the generated alloy may lie at 0.00001-0.1%, at 0.0001-0.1%, at 0.001-0.1%, at 0.001-0.0020 or at 0.0015-0.002%.

Optionally, the oxygen content may also be adjusted as follows:

0.00001-0.1
0.00002-0.1
0.00005-0.1
0.00008-0.1
0.0001-0.1
0.0002-0.1
0.0005-0.1
0.0008-0.1
0.001-0.1
0.002-0.1
0.005-0.1
0.008-0.1
0.010-0.1
0.00001-0.10
0.00001-0.08
0.00001-0.05
0.00001-0.03
0.00001-0.02

The nitrogen content must be smaller than or equal to 0.100%, in order to ensure the manufacturability and usability of the alloy. Too high nitrogen content leads to the formation of nitrides, which negatively influence the properties of the alloy. A too low nitrogen content increases the costs. The nitrogen content is therefore ≥0.00001%. The following restrictions of the nitrogen content are conceivable:

0.00001-0.1
0.00002-0.1
0.00005-0.1
0.00008-0.1
0.0001-0.1
0.0002-0.1
0.0005-0.1
0.0008-0.1
0.001-0.1
0.002-0.1
0.005-0.1
0.008-0.1
0.010-0.1
0.00001-0.10
0.00001-0.08
0.00001-0.05
0.00001-0.03
0.00001-0.02

Both in the powder and in fabricated components (3D printed samples), the particle sizes both of nitrides and of carbides and/or carbonitrides is very low (approximately <8 µm). In some cases, the above-mentioned particles may not be present or may be visible only after heat treatment. Small particle sizes of N-containing precipitates have positive effect on high-temperature properties and resistance to alternating loads (low-cycle Fatigue—LCF), since N-containing precipitates act as crack-initiation sites in conventionally manufactured alloys.

The argon content must be smaller than or equal to 0.08%, in order to ensure the manufacturability and usability of the alloy. Argon cannot be dissolved in the γ-matrix. and so it may negatively influence the mechanical properties of the structural part, since argon inclusions may act as crack-initiation sites. A too low argon content increases the costs. The argon content is therefore ≥0.0000001% (≥1 ppb). The following restrictions of the argon content are conceivable, wherein the argon contents from the powder manufacture as well as from the structural part manufacture are included:

0.0000001-0.05
0.0000002-0.05
0.0000001-0.005
0.0000001-0.002
0.0000001-0.001

The method according to the invention is intended to be usable preferably for the following alloys:
Alloy 601
Alloy 602 CA and its variant MCA
Alloy 617 and its variants 617 B and 617 OCC
Alloy 625
Alloy 690
Alloy 699XA
Alloy 718 and its variants
Alloy 780
Alloy 788
Alloy 80A
Alloy 81
Alloy X-750
Alloy C-263
Alloy K-500
Waspaloy
FM 625
FM 617 as well as
FM 602
Alloy 31
Alloy 31 Plus
Alloy 25
Alloy 28
Alloy 33
Alloy 59
Alloy 188
Alloy 310 L
Alloy 330
Alloy 333
Alloy 400
Alloy 600+600 L
Ally 800+800 H, HP, L
Alloy 825+825 CTP
Alloy 925
Alloy 926
Alloy 2120 MoN
Alloy B2
Alloy C 276
Crofer 22 APU
Crofer 22 H As examples, Table 1 shows ranges of analysis of the aforementioned alloys.

TABLE 1

| | Alloy 601 | Alloy 602 CA/MCA | FM 602 | Alloy 617 (B/OCC) | FM 617 | Alloy 625 | FM 625 | Alloy 690 | Alloy 699XA |
|---|---|---|---|---|---|---|---|---|---|
| C | 0.03-0.1 | 0.15-0.25 | 0.15-0.25 | 0.05-0.08 | 0.05-0.15 | -0.03 | -0.1 | -0.05 | 0.005-0.12 |
| S | -0.015 | -0.01 | | -0.008 | | -0.01 | | -0.015 | -0.01 |
| N | | | | | | | | | -0.05 |
| Cr | 21-25 | 24-26 | 24-26 | 21-23 | 20-24 | 21-23 | 20-23 | 27-31 | 26-30 |
| Ni | 58-63 | 59-66 | 59-66 | 45-58 | 50-61 | 58-71 | 58-71 | 58-66 | 62-72 |
| Mn | -1 | -0.5 | -0.5 | -0.5 | -1 | -0.5 | -0.5 | -0.5 | -0.5 |
| Si | -0.5 | -0.5 | -0.5 | -0.3 | -1 | -0.4 | -0.5 | -0.5 | -0.5 |
| Mo | | | | 8-10 | 8-10 | 8-10 | 8-10 | | |
| Ti | -0.5 | 0.1-0.2 | 0.1-0.2 | 0.25-0.5 | -0.6 | -0.4 | -0.4 | | -0.6 |
| Nb | | | | -0.6 | | | 3-4.1 | | -0.5 |
| Cu | -0.5 | -0.1 | -0.1 | -1.5 | -0.5 | | -0.5 | -0.5 | -0.5 |
| Fe | -18 | 8-11 | 8-11 | | -3 | -5 | -5 | 7-11 | -2.5 |
| P | -0.02 | -0.02 | | -0.012 | -0.03 | -0.01 | -0.01 | | -0.02 |
| Al | 1-1.7 | 1.8-2.4 | 1.8-2.4 | 0.8-1.3 | 0.8-1.5 | -0.4 | -0.4 | | 2-3 |
| Mg | | | | | | | | | |
| Ca | | | | | | | | | |
| V | | 0.01-0.1 | 0.01-0.1 | -0.6 | | | | | |
| Zr | | | | | -0.5 | | | | |
| W | | | | 11-13 | 10-15 | | | | -0.1 |
| Co | | | -1 | | | -1 | | | |
| B | -0.006 | | -0.006 | 0.001-0.005 | | | | | -0.008 |
| Nb + Ta | | | 3.2-3.8 | | | | 3.2-3.8 | | |
| Weitere Elemente/additional elements | | | | | | | | | |

| | Alloy 718 | Alloy 718 CTP | FM 718 | Alloy 780 | Alloy 788 | Waspaloy | Alloy C-263 | Alloy 80A | Alloy 81 |
|---|---|---|---|---|---|---|---|---|---|
| C | -0.08 | -0.045 | -0.08 | -0.1 | 0.04-0.1 | 0.02-0.1 | 0.04-0.08 | 0.04-0.1 | -0.08 |
| S | -0.015 | -0.01 | | -0.015 | -0.01 | -0.03 | -0.007 | -0.015 | -0.02 |
| N | | | | -0.03 | | | | | |
| Cr | 17-21 | 17-21 | 17-21 | 16-20 | 18-21 | 18-21 | 19-21 | 18-21 | 28-32 |
| Ni | 50-55 | 50-55 | 50-55 | 26-62 | 51-69 | 49.6-62.5 | 50-55 | 65-79 | 59-66 |
| Mn | -0.35 | -0.35 | -0.3 | -0.5 | -1 | -1 | -0.6 | -1 | -0.7 |
| Si | -0.35 | -0.35 | -0.3 | -0.3 | -0.5 | -0.75 | -0.4 | -1 | -0.7 |
| Mo | 2.8-3.3 | 2.8-3.3 | 2.8-3.3 | 2-4 | | 3.5-5 | 5.6-6.1 | | |
| Ti | 0.65-1.15 | 0.8-1.15 | 0.7-1.1 | 0.1-1 | 1.8-2.7 | 2.75-3.25 | 1.9-2.4 | 1.8-2.7 | 1.5-2.1 |
| Nb | 4.75-5.5 | Nb + Ta | 4.8-5.5 | | | | | | |
| Cu | -0.3 | -0.23 | -0.3 | -0.5 | -0.2 | -0.5 | -0.2 | -0.2 | -0.25 |
| Fe | 6-25 | 12-24 | -24 | -10 | 8-15 | -2 | -0.7 | -1.5 | -1.5 |
| P | -0.015 | -0.01 | -0.015 | -0.03 | -0.02 | -0.03 | -0.015 | | |
| Al | 0.2-0.8 | 0.4-0.6 | 0.2-0.8 | 1-3 | 1-1.8 | 1.2-1.6 | 0.3-0.6 | 1-1.8 | -1.2 |
| Mg | | | | -0.01 | | | | | |
| Ca | | | | -0.01 | | | | | |
| V | | | | | | | | | |
| Zr | | | | -0.05 | | 0.02-0.12 | | | |
| W | -1 | -1 | | 15-28 | 3-7 | | 19-21 | | |
| Co | | | | | | 12-15 | | | 0.01-0.1 |
| B | -0.006 | -0.006 | -0.006 | -0.02 | -0.008 | 0.003-0.01 | -0.005 | | -0.006 |
| Nb + Ta | | 0.8-1.15 | | | | | | | |
| Weitere Elemente/additional elements | | | | | | | | | 01. Mrz [March] |

TABLE 1-continued

| | | 4.87-5.2 | | 4-6 | | | | |
|---|---|---|---|---|---|---|---|---|
| Nb + Ta | | | | | | | | |
| Weitere Elemente/additional elements | | | | | | | | |
| | Alloy K-500 | Alloy X-750 | Alloy 31 Plus® | Alloy 28 | Alloy 31 | Alloy 33 | Alloy 59 | Alloy 188 |
| C | -0.18 | -0.08 | ≤0.01 | ≤0.015 | ≤0.015 | ≤0.015 | ≤0.01 | 0.05 to 0.15 |
| S | -0.01 | -0.01 | ≤0.01 | ≤0.01 | ≤0.01 | ≤0.01 | ≤0.01 | ≤0.015 |
| N | | | 0.1 to 0.25 | 0.04 to 0.07 | 0.15 to 0.25 | 0.35 to 0.6 | | |
| Cr | | 14-17 | 26.0 to 27.0 | 26 to 28 | 26 to 28 | 31 to 35 | 22 to 24 | 20 to 24 |
| Ni | 63-70 | 70-77.5 | 33.5 to 35.0 | 30 to 32 | 30 to 32 | 30 to 33 | 57 to 63 | 20 to 24 |
| Mn | -1.5 | -1 | 1.0 to 4.0 | ≤2 | ≤2 | ≤2 | ≤0.5 | ≤1.25 |
| Si | | | ≤0.10 | ≤0.7 | ≤0.3 | ≤0.5 | ≤0.1 | |
| Mo | -0.5 | -0.5 | 6.0 to 7.0 | 3 to 4 | 6 to 7 | 0.5 to 2 | 15 to 16.5 | 0.2 to 0.4 |
| Ti | 0.35-0.85 | 2.25-2.75 | | | | | | |
| Nb | | 0.7-1.2 | | | | | | |
| Cu | 27-33 | -0.5 | 0.5 to 1.5 | 1 to 1.4 | 1 to 1.4 | 0.3 to 1.2 | ≤0.5 | ≤3 |
| Fe | 0.5-2 | 5-9 | 22.5 to 33.5 | 32 to 40 | 29 to 37 | 26 to 38 | ≤1.5 | ≤≤0.015 |
| P | -0.02 | | ≤0.02 | ≤0.02 | ≤0.02 | ≤0.02 | ≤0.015 | ≤0.2 |
| Al | 2.3-3.15 | 0.4-1 | 0.3 | | | | 0.1 to 0.4 | |
| Mg | | | | | | | | |
| Ca | | | | | | | | |
| V | | | | | | | | |
| Zr | | | | | | | | |
| W | | | | | | | 13 to 16 | |
| Co | | -1 | | | | | | |
| B | | | | | | | ≤0.3 | ≤0.01 |
| Ni + Co | | | | | | | | |
| Nb + Ta | | | 0.7-1.2 | | | | | |

| | Alloy 310 L | Alloy 300 | Alloy 333 | Alloy 400 | Alloy 600 | Alloy 600 L | Alloy 800 | Alloy 800 H | Alloy 800 HP |
|---|---|---|---|---|---|---|---|---|---|
| Weitere Elemente/additional elements | | | | | | | | | |
| C | ≤0.02 | ≤0.15 | 0.03 to 0.06 | ≤0.15 | 0.05 to 0.1 | ≤0.025 | ≤0.1 | 0.06 to 0.10 | 0.06 to 0.1 |
| S | ≤0.005 | ≤0.015 | | ≤0.02 | ≤0.015 | ≤0.01 | ≤0.01 | ≤0.01 | ≤0.01 |
| N | | | | | | | | | |
| Cr | 24 to 25 | 15 to 17 | 24 to 26 | | 14 to 17 | 14 to 17 | 19.0 to 21.5 | 19 to 21 | 19 to 22 |
| Ni | 20 to 21 | 33 to 37 | 44 to 47 | ≥63 | ≥72 | ≥72 | 30.0 to 32.0 | 30 to 32 | 30 to 32 |
| Mn | ≤1 | ≤2 | 1.2 to 2 | ≤2 | ≤1 | ≤1 | 0.5 to 1.0 | 0.5 to 1 | 0.5 to 1 |
| Si | ≤0.15 | 1 to 2 | 0.8 to 1.2 | | ≤0.5 | ≤0.5 | 0.2 to 0.6 | 0.2 to 0.6 | 0.2 to 0.6 |
| Mo | ≤0.1 | | 2.5 to 3.5 | ≤0.5 | | | | | |
| Ti | | | 0.1 to 0.2 | | | | | | |
| Nb | | | | | | | | | |
| Cu | | | | 28 to 34 | ≤0.3 | ≤0.3 | 0.20 to 0.5 | 0.2 to 0.6 | 0.3 to 0.6 |
| Fe | | 42 to 51 | 13 to 22 | 1 to 2.5 | 6 to 10 | 6 to 10 | 41 to 47 | 43 to 50 | 43 to 50 |
| P | ≤0.02 | ≤0.045 | | | ≤0.02 | ≤0.015 | ≤0.015 | ≤0.015 | ≤0.015 |
| Al | | | | ≤0.5 | ≤0.3 | ≤0.3 | 0.20 to 0.40 | 0.2 to 0.6 | 0.3 to 0.6 |
| Mg | | | | | | | | | |
| Ca | | | | | | | | | |
| V | | | | | | | | | |
| Zr | | | | | | | | | |
| W | | | | | | | | | |
| Co | | | | | | | | | |
| B | | | | | | ≤0.006 | | | |
| Ni + Co | | | 2.5 to 3.5 | | | | | | |
| Nb + Ta | | | 2.5 to 3.5 | | | | | | |

TABLE 1-continued

| Weitere Elemente/additional elements | | | | | | | |
|---|---|---|---|---|---|---|---|
| | Alloy 800 L | Alloy 825 | Alloy 825 CTP | Alloy 925 | Alloy 926 | Alloy 2120 MoN | Alloy B-2 |
| | | | | | | Al + Ti max. 1.0% | Al + Ti max 0.7% Al + Ti 0.85% - 1.2% |
| C | ≤0.025 | ≤0.025 | ≤0.015 | ≤0.03 | ≤0.020 | ≤0.01 | ≤0.01 |
| S | ≤0.01 | ≤0.015 | ≤0.005 | ≤0.03 | ≤0.010 | ≤0.01 | ≤0.01 |
| N | | | ≤0.03 | | 0.15 to 0.25 | 0.02 to 0.15 | |
| Cr | 20 to 22 | 19.5 to 23.5 | 21 to 23 | 19.5 to 22.5 | 20.0 to 21.0 | 20.0 to 23.0 | 0.4 to 1 |
| Ni | 32 to 34 | 38 to 46 | 39 to 43 | 42 to 46 | 24.00 to 26.00 | 58 | 64 to 72 |
| Mn | 0.5 to 1 | ≤1 | 0.5 to 0.9 | ≤1 | ≤1.00 | ≤0.50 | ≤1 |
| Si | ≤0.7 | ≤0.5 | 0.2 to 0.5 | ≤0.5 | ≤0.50 | ≤0.1 | ≤0.08 |
| Mo | | | | 2.5 to 3.5 | 6.0 to 7.0 | 18.5 to 21.0 | 26 to 30 |
| Ti | 0.35 to 0.6 | 0.6 to 1.2 | 4.5 to 6.5 | 1.9 to 2.4 | | | |
| Nb | | | | ≤0.5 | | | |
| Cu | ≤0.5 | 1.5 to 3 | 1.6 to 2.3 | 1.5 to 3 | 0.5 to 1.5 | 0.5 | ≤0.5 |
| Fe | 41 to 47 | 20 to 38 | 20 to 38 | ≤22 | | ≤1.5 | 1.6 to 2 |
| P | ≤0.015 | ≤0.03 | | ≤0.03 | ≤0.030 | ≤0.015 | ≤0.02 |
| Al | 0.15 to 0.4 | ≤0.2 | 0.06 to 0.25 | 0.1 to 0.5 | | ≤0.4 | |
| Mg | | | 0.006 to 0.015 | | | | |
| Ca | | | | | | | |
| V | | | | | | | |
| Zr | | | | | | | |
| W | | | | | | | |
| Co | | | | | | ≤0.3 | |
| B | | ≤1 | ≤0.5 | | | ≤0.3 | ≤1 |
| Ni + Co | | | 0.002 to 0.004 | | | | |
| Nb + Ta | | | | | | | |
| Weitere Elemente/additional elements | Al + Ti 1.0% | | | | | | |

| | Alloy C-263 | Alloy C-276 | Crofer 22 APU | Crofer 22 H | NeutroShield |
|---|---|---|---|---|---|
| C | 0.04 to 0.08 | ≤0.01 | ≤0.03 | ≤0.03 | ≤0.08 |
| S | ≤0.007 | ≤0.01 | ≤0.020 | ≤0.006 | ≤0.030 |
| N | | | | ≤0.04 | ≤0.10 |
| Cr | 19.0 to 21.0 | 15 to 16.5 | 20.0 to 24.0 | 20 to 24 | 18.00 to 20.00 |
| Ni | 50 to 55 | 51 to 63 | | ≤0.5 | 12.00 to 15.00 |
| Mn | 0.6 | ≤1 | 0.30 to 0.80 | ≤0.8 | ≤2.00 |
| Si | ≤0.4 | ≤0.08 | ≤0.50 | | |
| Mo | | 15 to 17 | | | |
| Ti | 5.6 to 6.1 | | | 0.1 to 0.6 | |
| Nb | 1.90 to 2.40 | | 0.03 to 0.20 | 0.02 to 0.2 | |
| Cu | | | | 0.2 to 1 | |
| Fe | ≤0.2 | 4 to 7 | ≤0.50 | ≤0.5 | R |
| P | ≤0.7 | | ≥73 | 70 to 79 | |
| Al | ≤0.015 | ≤0.02 | ≤0.050 | ≤0.05 | ≤0.045 |

TABLE 1-continued

| | | | | |
|---|---|---|---|---|
| Mg | 0.30 to 0.60 | | ≤0.50 | ≤0.1 |
| Ca | | | | |
| V | | | | |
| Zr | | ≤0.3 | | |
| W | | | | |
| Co | | | | 1 to 3 |
| B | | | | |
| Ni + Co | 19.0 to 21.0 | 3 to 4.5 | | |
| Nb + Ta | ≤0.005 | ≤2.5 | | ≤0.2 |
| | | | | 0.20 to 2.25 |
| Weitere Elemente/additional elements | Ag: max. 0.0005; Zr: max. 0.02; Al + Ti: 2.40-2.80; Ni: Rest. Pb, Ag, Zr: Bestimmung nur auf Bestellung, only if ordered | | | Si 0.75% (max) |

Powders with a particle size from 5 μm to 250 μm are obtained.

A too small particle size below 5 μm impairs the flow behavior and is therefore to be avoided; a too large particle size above 250 μm impairs the behavior during additive fabrication.

A too low bulk density of 2 g/cm$^3$ impairs the behavior during additive fabrication. The greatest possible bulk density of approximately 8 g/cm$^3$ is imposed by the density of the alloy.

The oxygen content must be smaller than or equal to 0.100%, in order to ensure the manufacturability and usability of the alloy. A too low oxygen content increases the costs. The oxygen content is therefore 0.0001%. The powders manufactured according to this method may be used in the additive fabrication for construction of components that have the properties of the underlying alloys.

Moreover, the powder described above may also be used for the manufacture of the structural parts by means of hot isostatic pressing (HIP) or conventional sintering and extrusion-pressing processes. Moreover, the method combination of additive fabrication and subsequent HIP treatment is possible. For this purpose it is possible to apply the post processing steps described below for HIP structural parts for the generative fabrication.

The powders fabricated according to this method and also components fabricated from this powder (3D printed samples) are free of nitrides and also of carbides and/or carbonitrides. Should nitrides and also of carbides nevertheless be present, these have a particle size in the diameter of <100 nm especially <50 nm.

After a heat treatment of components fabricated from this powder (3D printed samples) for homogenization, diffusion annealing above 900° C., especially above 1000° C., ideally above 1100° C. for more than 1 hour, nitrides and also of carbides and/or carbonitrides may appear in the fabricated components (3D printed samples). These have a particle size in the diameter of <8 μm, or respectively <5 μm, ideally <1 μm, especially <500 nm. By way of example, the method according to the invention is explained as follows:

Melts in the following were generated with the method according to the invention and fabricated as powder (values in wt %):

TABLE 2

| Charge | P10030 | P10036 | P10038 | P10039 | P10046 | P10049 | P10057 | P10153 | P10154 | P10155 |
|---|---|---|---|---|---|---|---|---|---|---|
| C | 0.022 | 0.027 | 0.025 | 0.026 | 0.028 | 0.023 | 0.033 | 0.002 | 0.002 | 0.003 |
| S | 0.0005 | 0.0005 | 0.0006 | 0.0005 | 0.0007 | 0.0006 | 0.001 | 0.002 | 0.002 | 0.002 |
| N | 0.007 | 0.008 | 0.006 | 0.008 | 0.005 | 0.008 | 0.007 | 0.004 | 0.004 | 0.003 |
| Cr | 18.33 | 18.38 | 17.94 | 18.35 | 17.94 | 18.95 | 18.56 | 22.46 | 22.48 | 22.72 |
| Ni | 53.07 | 53.24 | 52.33 | 53.24 | 53.32 | 52.2 | 53.44 | 60.91 | 60.71 | 60.5 |
| Mn | 0.04 | 0.03 | 0.18 | 0.1 | 0.03 | 0.11 | 0.03 | 0.2 | 0.19 | 0.18 |
| Si | 0.06 | 0.05 | 0.18 | 0.08 | 0.04 | 0.16 | 0.06 | 0.01 | 0.01 | 0.01 |
| Mo | 2.98 | 3.03 | 2.96 | 3.01 | 3.05 | 3.13 | 2.98 | 15.43 | 15.42 | 15.48 |
| Ti | 0.93 | 0.93 | 1.28 | 0.98 | 0.9 | 0.92 | 0.95 | 0.01 | 0.01 | 0.01 |
| Nb | 5.28 | 5.37 | 5.18 | 5.09 | 5.41 | 5.61 | 5.39 | 0.01 | 0.01 | 0.01 |
| Cu | 0.03 | 0.02 | 0.14 | 0.05 | 0.02 | 0.03 | 0.03 | 0.01 | 0.01 | 0.01 |
| Fe | 18.52 | 18.18 | 17.66 | 18.01 | 18.55 | 17.63 | 17.82 | 0.52 | 0.66 | 0.67 |
| P | 0.009 | 0.008 | 0.039 | 0.013 | 0.007 | 0.011 | 0.007 | 0.002 | 0.002 | 0.002 |
| Al | 0.55 | 0.58 | 0.8 | 0.6 | 0.52 | 0.53 | 0.46 | 0.24 | 0.31 | 0.22 |
| Mg | 0.001 | 0.001 | 0.011 | 0.005 | 0.001 | 0.002 | 0.001 | 0.001 | 0.001 | 0.001 |
| Ca | 0.001 | 0.001 | 0.002 | 0.004 | 0.001 | 0.004 | 0.001 | 0.001 | 0.001 | 0.001 |
| V | 0.02 | 0.02 | 0.18 | 0.06 | 0.02 | 0.13 | 0.02 | 0.16 | 0.15 | 0.15 |
| Zr | 0.01 | 0.01 | 0.05 | 0.05 | 0.01 | 0.03 | 0.01 | — | — | — |
| W | 0.03 | 0.03 | 0.19 | 0.09 | 0.06 | 0.06 | 0.02 | 0.01 | 0.01 | 0.01 |
| Co | 0.1 | 0.08 | 0.84 | 0.22 | 0.07 | 0.44 | 0.08 | 0.01 | 0.01 | 0.01 |
| B | 0.004 | 0.004 | 0.007 | 0.004 | 0.004 | 0.01 | 0.004 | 0.001 | 0.001 | 0.001 |

| Charge | P10156 | P10157 | P10207 | P10208 | P10209 | P10210 | P10211 | P10212 | P10213 | P10214 | P10215 |
|---|---|---|---|---|---|---|---|---|---|---|---|
| C | 0.003 | 0.002 | 0.002 | 0.002 | 0.002 | 0.002 | 0.002 | 0.002 | 0.003 | 0.002 | 0.002 |
| S | 0.002 | 0.002 | 0.003 | 0.003 | 0.003 | 0.003 | 0.003 | 0.003 | 0.003 | 0.003 | 0.003 |
| N | 0.004 | 0.005 | 0.003 | 0.005 | 0.004 | 0.004 | 0.003 | 0.006 | 0.005 | 0.002 | 0.003 |
| Cr | 22.78 | 22.66 | 22.8 | 22.65 | 22.95 | 22.66 | 22.5 | 22.54 | 22.43 | 22.46 | 22.49 |
| Ni | 60.27 | 60.19 | 60.4 | 60.34 | 60.27 | 60.36 | 60.82 | 60.4 | 61.01 | 60.89 | 60.59 |
| Mn | 0.19 | 0.18 | 0.22 | 0.22 | 0.2 | 0.18 | 0.19 | 0.18 | 0.19 | 0.15 | 0.17 |
| Si | 0.01 | 0.01 | 0.04 | 0.01 | 0.03 | 0.02 | 0.02 | 0.02 | 0.01 | 0.02 | 0.02 |
| Mo | 15.71 | 16.02 | 15.5 | 15.64 | 15.47 | 15.68 | 15.39 | 15.77 | 15.39 | 15.39 | 15.68 |
| Ti | 0.01 | 0.01 | 0.01 | 0.01 | 0.01 | 0.01 | 0.01 | 0.01 | 0.01 | 0.01 | 0.01 |
| Nb | 0.01 | 0.01 | 0.01 | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 | 0.01 | 0.01 | 0.01 |
| Fe | 0.61 | 0.45 | 0.61 | 0.61 | 0.53 | 0.53 | 0.53 | 0.52 | 0.44 | 0.52 | 0.51 |
| P | 0.002 | 0.002 | 0.002 | 0.002 | 0.002 | 0.002 | 0.002 | 0.002 | 0.002 | 0.002 | 0.002 |
| Al | 0.22 | 0.28 | 0.22 | 0.24 | 0.27 | 0.26 | 0.28 | 0.26 | 0.26 | 0.29 | 0.27 |
| Mg | 0.001 | 0.001 | 0.001 | 0.001 | 0.001 | 0.001 | 0.001 | 0.001 | 0.001 | 0.001 | 0.001 |
| Ca | 0.001 | 0.001 | 0.001 | 0.001 | 0.001 | 0.001 | 0.001 | 0.001 | 0.001 | 0.001 | 0.001 |
| V | 0.14 | 0.14 | 0.14 | 0.14 | 0.13 | 0.14 | 0.14 | 0.15 | 0.14 | 0.14 | 0.15 |
| Zr | — | — | — | — | — | — | — | — | — | — | — |
| W | 0.01 | 0.01 | 0.01 | 0.01 | 0.01 | 0.02 | 0.01 | 0.01 | 0.01 | 0.01 | 0.01 |
| Co | 0.01 | 0.01 | 0.01 | 0.08 | 0.09 | 0.1 | 0.07 | 0.09 | 0.06 | 0.08 | 0.06 |
| B | 0.001 | 0.001 | 0.001 | 0.001 | 0.001 | 0.001 | 0.001 | 0.001 | 0.001 | 0.001 | 0.001 |

Chemical compositions of the powder manufactured with the method according to the invention are indicated in Table 2.

Both powder and also in fabricated components (3D printed samples) were free of nitrides and also of carbides.

After an annealing at a temperature of 1100° C. for 1 hour followed by a quenching in water, particles such as nitrides and also carbides and/or carbonitrides were present in fabricated components (3D printed samples). These had a particle size in the diameter of smaller than 1 μm.

The invention claimed is:

1. A method for the manufacture of a powder from a nickel-base alloy,
wherein the contents (in wt %) of the alloy are defined as follows:

| | |
|---|---|
| C | max. 0.5% |
| S | max. 0.15%, especially max. 0.03% |
| N | max. 0.25% |
| Cr | 14-35%, especially 17-28% |
| Ni | Rest (>38%) |
| Mn | max. 4% |
| Si | max. 1.5% |
| Mo | >0-22% |
| Ti | ≤4%, especially ≤3.25% |
| Nb | up to 6.0% |
| Cu | up to 3%, especially up to 0.5% |
| Fe | ≤50% |
| P | max. 0.05%, especially max. 0.04% |
| Al | up to 3.15%, especially up to 2.5% |
| Mg | max. 0.015% |
| V | max. 0.6% |
| Zr | max. 0.12%, especially max. 0.1% |
| W | up to 4.5%, especially up to max. 3% |
| Co | up to 28% |
| B | ≤0.125% |
| O | >0.00001-0.1% | and manufacturing-related impurities,
wherein:
Ni+Fe+Co 56-80%
Nb+Ta≤6.0%,
wherein:
the alloy is smelted in a Vacuum Induction Melting (VIM) furnace to form a melt,
the melt is maintained in molten form for 5 minutes to 2 hours for homogenization,
a closed atomization system having a supplied gas is adjusted to a dew point of −10° C. to −120° C.,
the melt is blown by a nozzle in a gas stream with a volume gas flow rate of 2 m³/min to 150 m³/min to form solidified powder particles,
the solidified powder particles are collected in a gas-tight closed container, wherein
the particles have a particle size of 5 μm to 250 μm,
the particles of the powder are spherical,
the powder has gas inclusions of 0.0 to 4% pore area (pores>1 μm) in relationship to a total area of evaluated objects,
the powder has a bulk density of 2 g/cm³ up to the density of the alloy, which is approximately 8 g/cm³,
the powder is packed air-tightly under a protective-gas atmosphere with argon.

2. The method according to claim 1, wherein the alloy is first generated as a master alloy ingot having defined chemical analysis by melting in the Vacuum Induction Melting (VIM) furnace, Vacuum Induction Metling/Electroslag Remelting (VIM/ESR) furnace, Vacuum Induction Metling/Electroslag Remelting/Vacuum Arc Remelting (VIM/ESR/VAR) furnace, Vacuum Induction Metling/Vacuum Arc Remelting (VIM/VAR) furnace, Vacuum Oxygen Decarburization (VOD) furnace or (Vacuum Ladle Furnace (VLF) then remelting in the ESR furnace and/or VAR furnace,
the master alloy ingot is cut into pieces by sawing,
the pieces of the master alloy ingot are melted in a VIM furnace.

3. The method according to claim 1 wherein an inert gas is used as the supplied gas.

4. The method according to claim 1 wherein argon is used as the supplied gas.

5. The method according to claim 1 wherein the gas stream in which atomization takes place consists of argon.

6. The method according to claim 1 wherein the gas stream in which atomization takes place consists of nitrogen.

7. The method according to claim 1 wherein the gas stream in which atomization takes place consists of a mixture of nitrogen and argon.

8. The method according to claim 1 wherein the atomization of the melt takes place at 0.5 to 80 kg/min.

9. The method according to claim 1, further comprising using the powder to produce 3D printed samples by additive fabrication.

10. The method according to claim 1, further comprising using the powder for the additive fabrication of layers on components or structural parts.

11. The method according to claim 1, further comprising using the powder for the fabrication of components of turbines.

12. The method according to claim 1, further comprising using the powder for the fabrication of components for the oil and gas industry or the chemical process industry.

13. The method according to claim 1, further comprising using the powder for the fabrication of valves or flanges.

* * * * *

UNITED STATES PATENT AND TRADEMARK OFFICE
CERTIFICATE OF CORRECTION

PATENT NO. : 12,152,290 B2  
APPLICATION NO. : 17/603835  
DATED : November 26, 2024  
INVENTOR(S) : Christina Schmidt et al.

Page 1 of 1

It is certified that error appears in the above-identified patent and that said Letters Patent is hereby corrected as shown below:

In the Claims

In Claim 1, Line 6 (Line 17 of Column 21): after "max. 0.15%," delete "especially max. 0.03%"

In Claim 1, Line 8 (Line 19 of Column 21): after "14-35%," delete "especially 17-28%"

In Claim 1, Line 13 (Line 24 of Column 21): after "≤4%," delete "especially ≤3.25%"

In Claim 1, Line 15 (Line 26 of Column 21): after "up to 3%," delete "especially up to 0.5%"

In Claim 1, Line 17 (Line 28 of Column 21): after "max. 0.05%," delete "especially max. 0.04%"

In Claim 1, Line 18 (Line 29 of Column 21): after "up to 3.15%," delete "especially up to 2.5%"

In Claim 1, Line 21 (Line 32 of Column 21): after "max. 0.12%," delete "especially max. 0.1%"

In Claim 1, Line 22 (Line 33 of Column 21): after "up to 4.5%," delete "especially up to max. 3%"

Signed and Sealed this  
Twenty-fourth Day of December, 2024

Derrick Brent  
*Acting Director of the United States Patent and Trademark Office*